US012515575B2

(12) United States Patent
Behnke

(10) Patent No.: US 12,515,575 B2
(45) Date of Patent: Jan. 6, 2026

(54) SPLIT TILT DECK TRAILER AND ASSOCIATED SYSTEMS AND METHODS

(71) Applicant: Behnke Enterprises, Inc., Farley, IA (US)

(72) Inventor: Ryan Behnke, Farley, IA (US)

(73) Assignee: Behnke Enterprises, Inc., Farley, IA (US)

(*) Notice: Subject to any disclaimer, the term of this patent is extended or adjusted under 35 U.S.C. 154(b) by 0 days.

(21) Appl. No.: 17/880,039

(22) Filed: Aug. 3, 2022

(65) Prior Publication Data

US 2023/0026884 A1 Jan. 26, 2023

Related U.S. Application Data

(63) Continuation of application No. 16/793,479, filed on Feb. 18, 2020, now Pat. No. 11,440,455.

(60) Provisional application No. 62/807,013, filed on Feb. 18, 2019.

(51) Int. Cl.
*B60P 1/43* (2006.01)
*B60P 1/24* (2006.01)
*B62D 53/06* (2006.01)

(52) U.S. Cl.
CPC ............... *B60P 1/433* (2013.01); *B60P 1/24* (2013.01); *B62D 53/062* (2013.01)

(58) Field of Classification Search
CPC .............................. B60P 1/433; B62D 53/062

USPC ........................................................ 414/537
See application file for complete search history.

(56) References Cited

U.S. PATENT DOCUMENTS

| | | | | |
|---|---|---|---|---|
| 3,720,335 | A * | 3/1973 | Ward | B60P 1/433 |
| | | | | 414/469 |
| 4,516,902 | A * | 5/1985 | Matson | B60P 1/433 |
| | | | | 414/483 |
| 4,792,274 | A * | 12/1988 | Cockram | B60P 1/433 |
| | | | | 14/71.1 |
| 4,995,129 | A * | 2/1991 | Comardo | B62D 63/061 |
| | | | | 14/72.5 |
| 5,331,701 | A * | 7/1994 | Chase | A61G 3/067 |
| | | | | 14/71.1 |
| 5,688,099 | A * | 11/1997 | Fischer | B60P 3/122 |
| | | | | 410/3 |
| 7,976,264 | B1 * | 7/2011 | Pope | B60P 1/431 |
| | | | | 414/537 |
| 9,656,588 | B2 * | 5/2017 | Robertson | B60P 3/06 |
| 10,010,461 | B2 * | 7/2018 | Kitchin | A61G 3/066 |
| 10,752,148 | B2 * | 8/2020 | Selzer | B60P 1/433 |
| 11,440,455 | B2 * | 9/2022 | Behnke | B62D 53/062 |
| 2002/0187021 | A1 * | 12/2002 | Drost | B60P 1/43 |
| | | | | 414/469 |
| 2005/0036869 | A1 * | 2/2005 | Negranti | B60P 3/07 |
| | | | | 414/537 |

* cited by examiner

*Primary Examiner* — Jonathan Snelting
(74) *Attorney, Agent, or Firm* — DENTONS DAVIS BROWN PC; Matthew Warner-Blankenship

(57) ABSTRACT

The disclosed devices, systems and methods relate to a split-tilt deck trailer. A tilting deck and stationary deck are disposed in parallel on the trailer to provide a tilting deck for the loading of various equipment and providing an elongate stationary platform simultaneously.

18 Claims, 11 Drawing Sheets

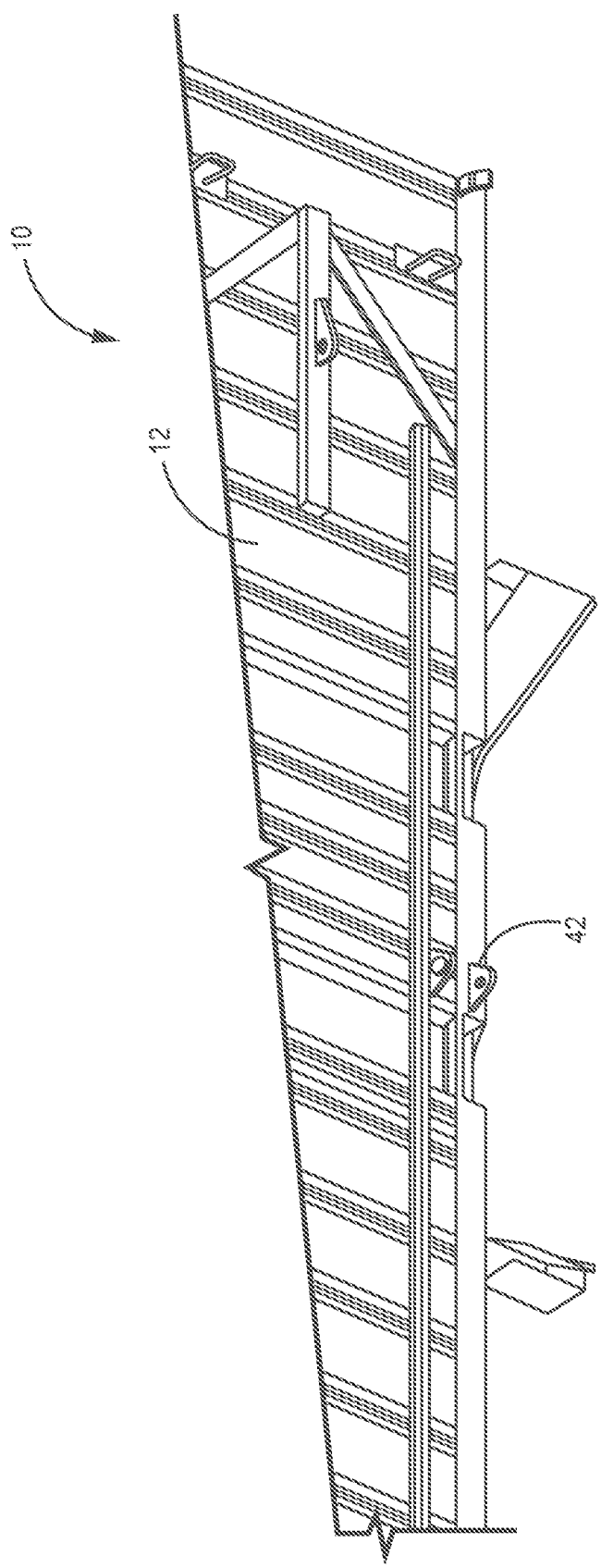

SPLIT TILT DECK TRAILER AND ASSOCIATED SYSTEMS AND METHODS

CROSS-REFERENCE TO RELATED APPLICATION(S)

This application is a continuation of U.S. application Ser. No. 16/793,479, filed Feb. 18, 2020, which claims the benefit under 35 U.S.C. § 119(e) to U.S. Provisional Application 62/807,013, filed Feb. 18, 2019, and entitled "Split Tilt Deck Trailer and Associated Systems and Methods," which is hereby incorporated by reference in its entirety for all purposes.

TECHNICAL FIELD

The disclosure relates generally to trailers and in particular, to the devices, methods, and design principles allowing for the provision of a split-tilt deck trailer.

BACKGROUND

The disclosure relates generally to a split-tilt deck trailer. In known designs, such as those shown in FIGS. 1A and 1B, some trailers 2 are built with tilt decks 4 for loading equipment. These tilt decks 4 typically have a bed of a certain length, and a width equal to the distance between the fenders 6. These known trailers 2 are designed in one of two configurations: a full tilt trailer 2, where the whole deck tilts (such as that shown in FIG. 1A), or a split-deck tilt, where the trailer 2 includes a tilt deck 4 and a stationary platform 5 in front of the tilt deck, such as shown in FIG. 1B. Various other known trailers 2 include trailers 2 with a completely rigid deck 4, as is shown in FIG. 1C. Various equipment can be loaded on these rigid deck trailers 2 via ramps 8.

Thus, there is a need in the art for improved trailer designs.

BRIEF SUMMARY

Discussed herein are various devices, systems, and methods relating to a split-tilt deck trailer for quicker, easier, and safer loading for narrow track equipment, such as directional drills, trenchers, and scissor lifts, while also maintaining ample area to store machine accessories, attachments, tools and building materials.

One general aspect includes a split-tilt deck trailer, including an elongate tilt deck; and an elongate stationary deck, where the elongate tilt deck is constructed and arranged to pivot relative to the elongate stationary deck for implement loading.

Implementations may include one or more of the following features. The split-tilt deck trailer further including a stationary front deck. The split-tilt deck trailer further including a ramp. The split-tilt deck trailer where the ramp is disposed at the distal end of the elongate tilt deck. The split-tilt deck trailer further including a locking mechanism. The split-tilt deck trailer where the locking mechanism is constructed and arranged to selectively lock the tilt deck in a substantially horizontal position. The split-tilt deck trailer where the tilt deck and locking mechanism are constructed and arranged such that the tilt deck is capable of an unlocked loading state and a locked transport state.

One general aspect includes a trailer including: a frame, an elongate first deck operatively engaged with the frame such that the elongate first deck is pivotable relative to the frame, and an elongate second deck operatively engaged with the frame such that the elongate second deck remains stationary when the elongate first deck is pivoted relative to the frame and where the elongate second deck is adjacent to elongate first deck.

Implementations may include one or more of the following features. The trailer further including a third deck disposed at a first end of the elongate first deck and elongate second deck. The trailer further including a ramp, disposed at a distal end of the elongate tilt deck. The trailer further including a first fender and a second fender. The trailer where the first fender is fixedly attached to the elongate first deck. The trailer further including an adjustable coupler fixedly attached to the frame. The trailer where the elongate first deck is operatively engaged with the frame via a tilting mechanism.

One general aspect includes a split-deck trailer including a frame; a tilt deck operatively engaged with the frame via a tilting mechanism, the tilting mechanism including a pivot point and a locking mechanism. The split-deck trailer also includes a stationary deck. In some aspects the split-deck trailer where the tilt deck is configured to transition between a substantially horizontal locked position and a tilted position via the tilting mechanism.

Implementations may include one or more of the following features. The split-deck trailer where the stationary deck is substantially adjacent to and parallel with the tilt deck when the tilt deck is in the locked position. The split-deck trailer where the locking mechanism further includes a handle, a safety pin, and a latch. The split-deck trailer where the locking mechanism further includes at least one latch hook, at least one lug, and at least one axle. The split-deck trailer further including a cushioned cylinder in operational communication with the tilt deck. The split-deck trailer where the cushioned cylinder is in further operational communication with a hydraulic system.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 9B is an underside view of the tilt deck without the main frame, according to one implementation.

DETAILED DESCRIPTION

Figure 1A:
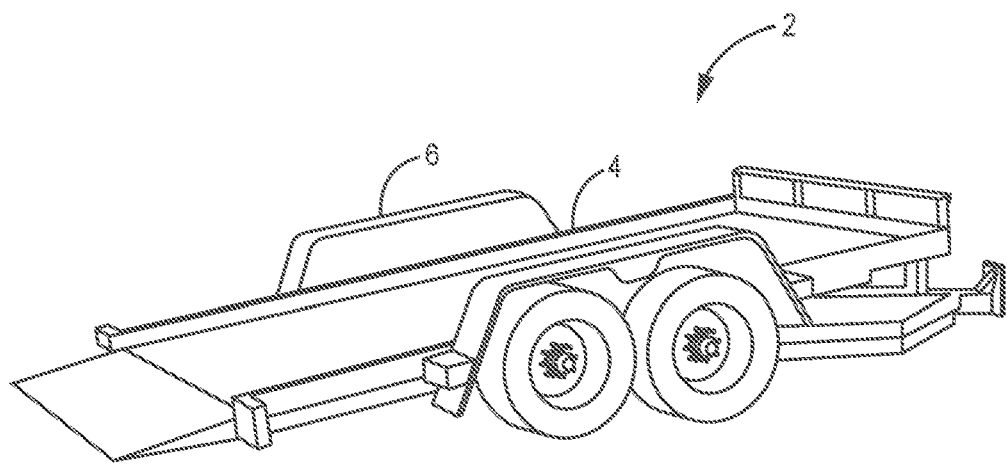
FIG. 1A is a prior art tilt deck trailer.
Figure 1B:
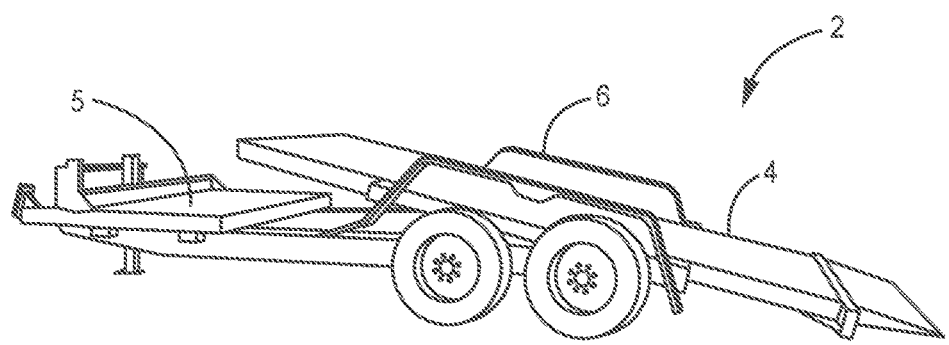
FIG. 1B is an alternate prior art tilt deck trailer.
Figure 1C:
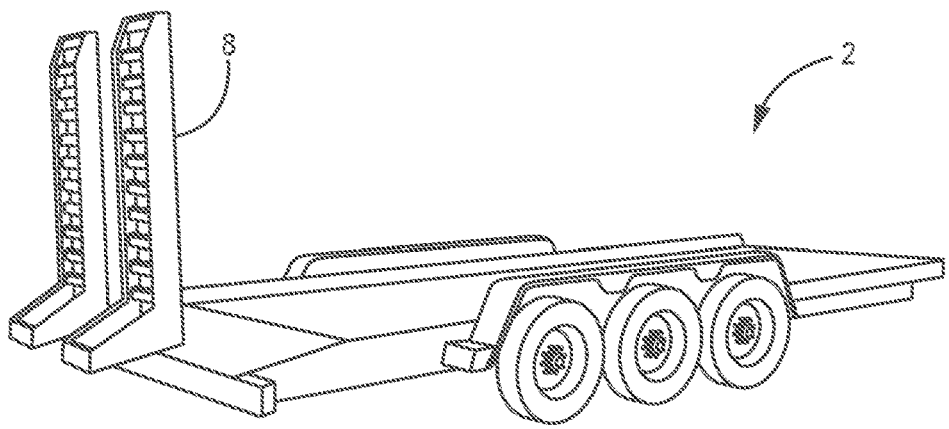
FIG. 1C is a prior art fixed-deck trailer.

The various devices, systems, and methods disclosed and contemplated herein relate to a split-tilt deck trailer 10 for loading various equipment. In various implementations, the disclosed trailer 10 is for use in connection with narrow equipment. When loading narrow equipment on a standard tilt trailer 2, such as those shown in FIGS. 1A and 1B, large portions of the trailer deck 4 are unused. The disclosed split deck trailer 10 allows for a tilt deck for loading various narrow equipment while also providing an elongate stationary deck.

Turning to the figures in more detail, FIGS. 2A-4 show various views of the disclosed spilt deck trailer 10. In various implementations, the split-tilt deck trailer 10 has an elongate tilt deck 12 disposed adjacent to an elongate stationary deck 14. Both the tilt deck 12 and stationary deck 14 are disposed on a frame 44. In some implementations, the trailer 10 includes an optional stationary front deck 16. The optional stationary front deck 16, is provided in the implementations of FIGS. 2A-2B, but as would be appreciated, it is an optional component.

In various implementations, the trailer 10 includes a ramp 18 disposed at the rear or loading end of the tilt deck 12 to facilitate loading and unloading, as would be further appreciated.

Figure 2A:
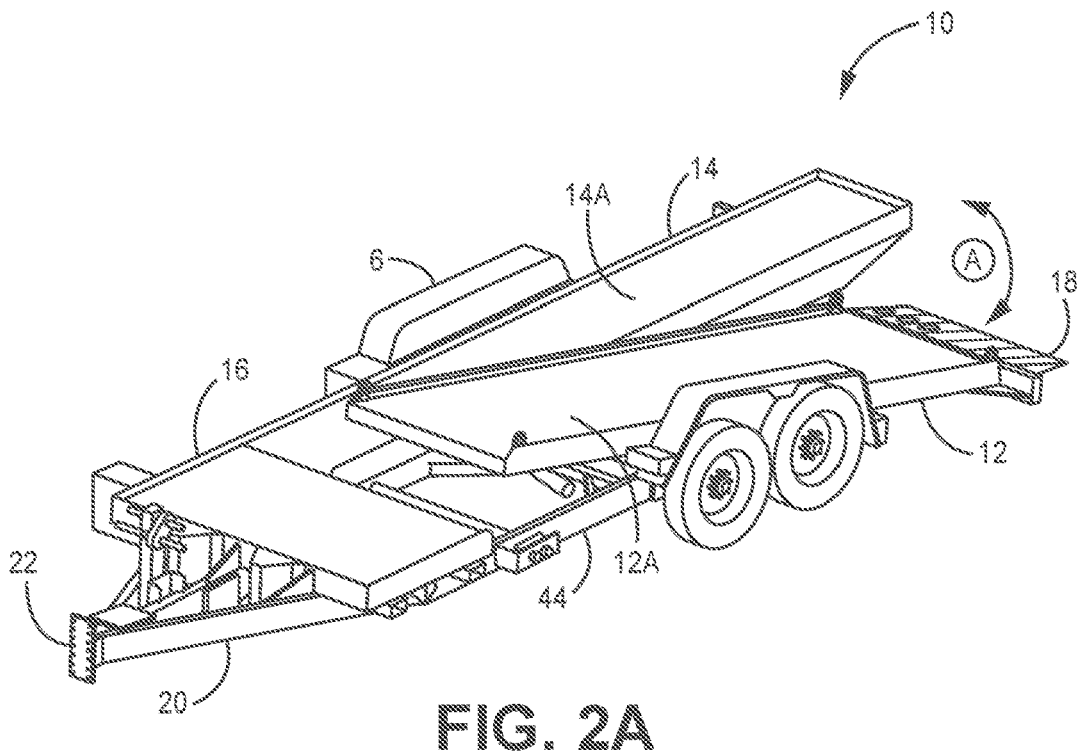
FIG. 2A is a front isometric view of the split-tilt deck trailer, according to one implementation.
Figure 2B:
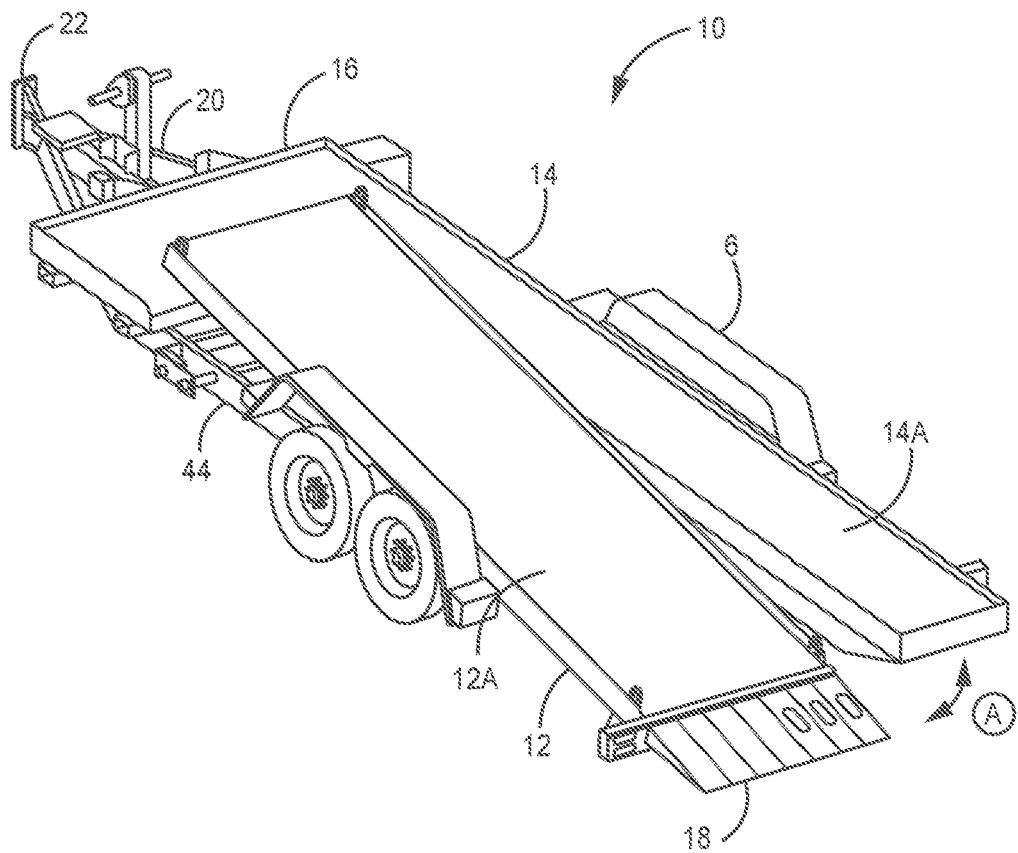
FIG. 2B is another isometric view of the implementation of FIG. 2A, showing the rear side of the split-tilt deck trailer, according to these embodiments.
Figure 3:
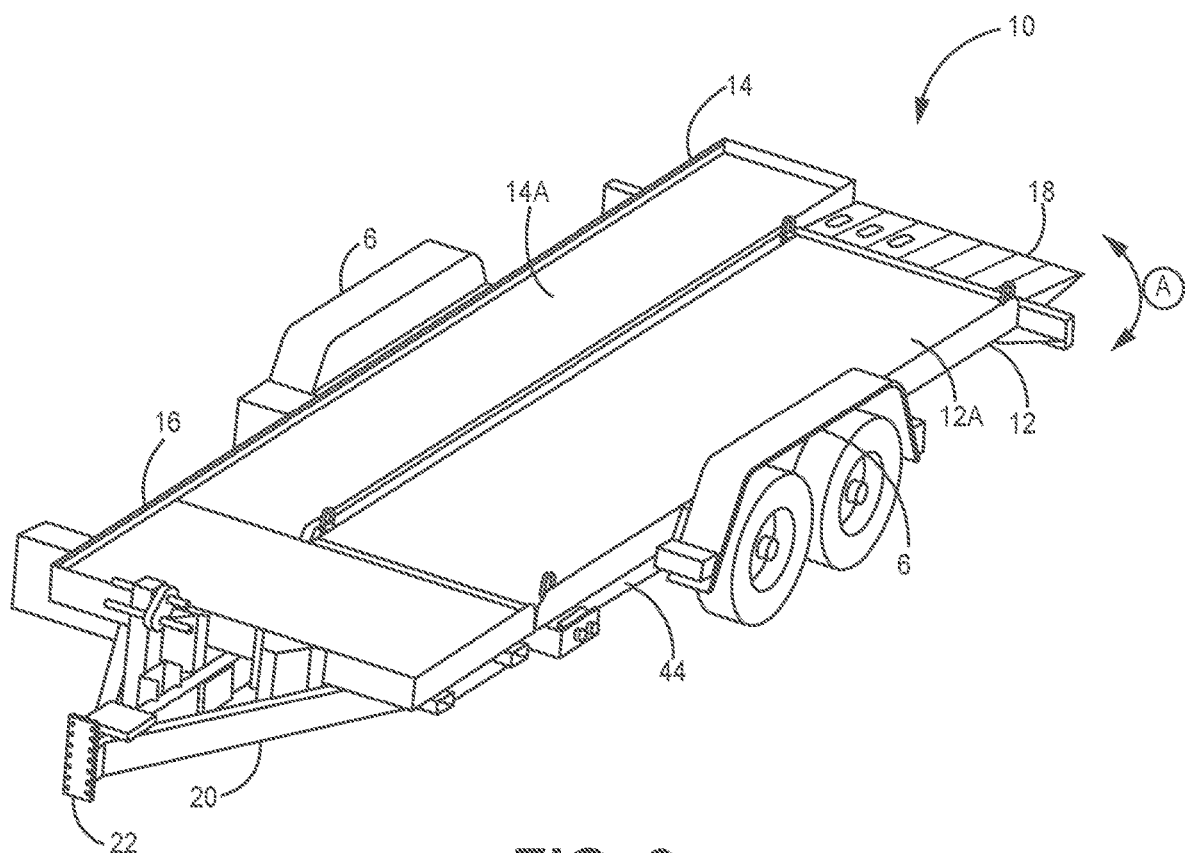
FIG. 3 is an isometric view of the split-tilt deck trailer in the locked or transport position, according to certain implementations.
Figure 4:
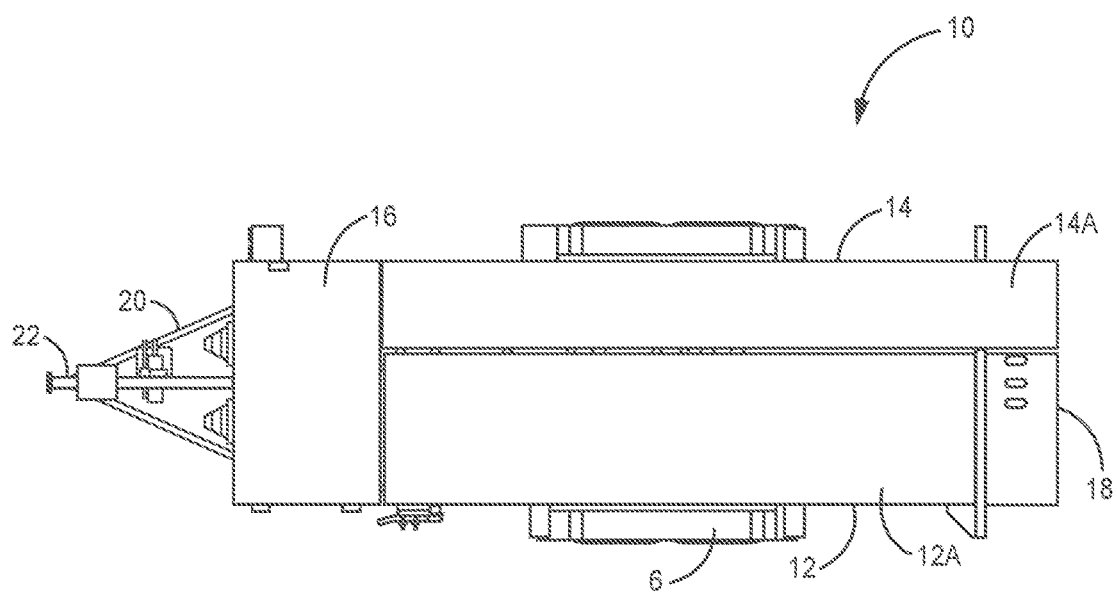
FIG. 4 is a top view of the split-tilt deck trailer, according to certain implementations.

In these and further implementations, the tilt deck 12 and elongate stationary deck 14 are adjacent to one another such that the tilt deck 12 loading surface 12A can be tilted or raised (shown by reference arrow A) to be brought into alignment with the elongate stationary deck surface 14A. In various implementations, the tilt deck 12 can be tilted or lowered to facilitate loading equipment, as is shown in FIGS. 2A-2B and illustrated with reference arrow A. It is appreciated that in various of these implementations, the tilt deck 12 pivots along an axle or other rotational component disposed on the underside of the trailer 10. In some implementations, the pivot point or fulcrum is near the fenders 6, so as to provide for a scissoring range of motion between the loading and transport positions, as is further discussed in relation to FIGS. 5-10.

Continuing with FIGS. 2A-B, 3 and 4, in these and other implementations, the trailer 10 has an A-frame tongue 20 with a pintle hitch or adjustable coupler 22. The tongue 20 and adjustable coupler 22 may be operatively engaged with or integral to the frame 44.

Figure 5:
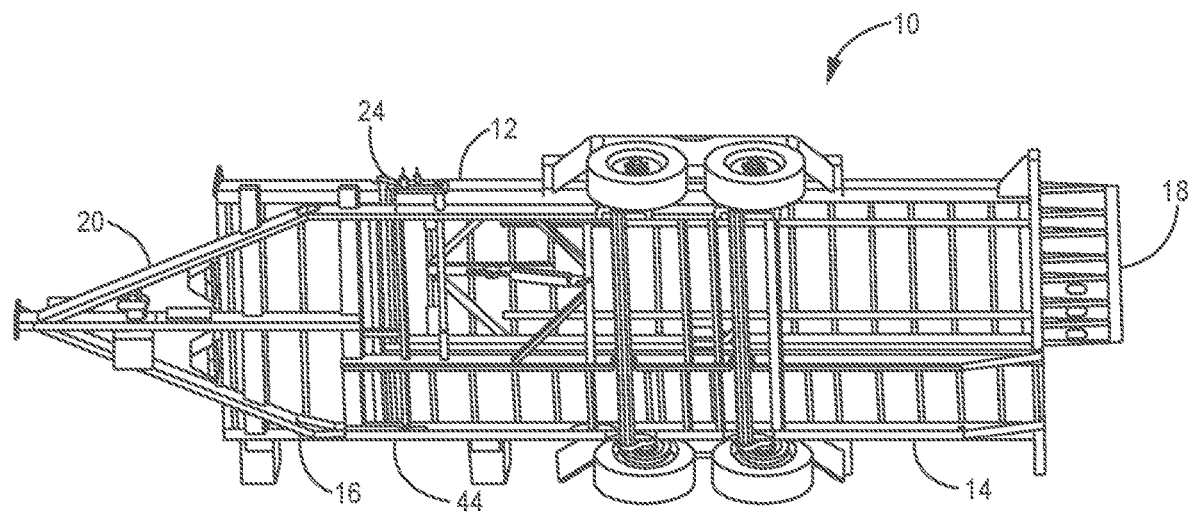
FIG. 5 is an underside view of the split-tilt deck trailer in the locked or transport position, according to certain implementations.
Figure 6:
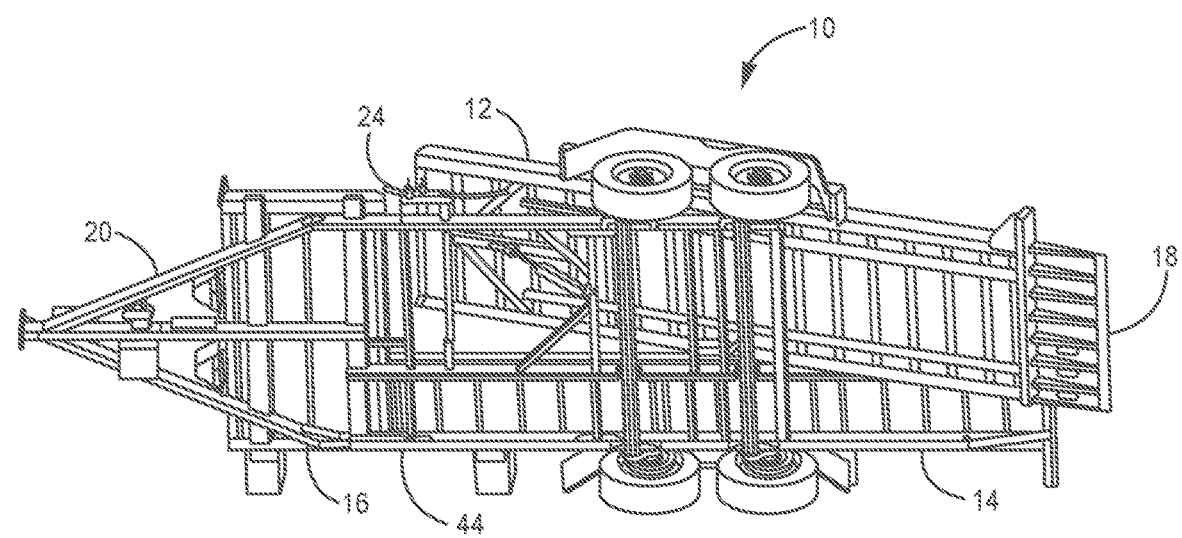
FIG. 6 is an underside view of the split-tilt deck trailer in the unlocked or loading position, according to further implementations.

In various implementations, the tilt deck 12, stationary deck 14, and optional stationary front deck 16 are disposed on the frame 44, as shown in FIGS. 5 and 6. In some implementations, the frame 22 is a tubular frame 44. As would be understood, the tilt deck 12 is secured to the frame 44 of the trailer via a tilting mechanism (not shown) so as to facilitate smooth and controlled tilting between the loading and locked positions. In certain implementations, the tilt deck 12 is constructed and arranged so as to be strategically weighted, that is lowered by gravity when not carrying a load.

The tilt deck 12 of these implementations is disposed on the driver side and the stationary deck 14 on the passenger side, though it is readily appreciated that in alternate implementations the tilt deck 12 may be disposed on the passenger side and the stationary deck 14 on the driver side.

As shown in FIG. 7-10, the trailer 10 according to certain implementations has a locking mechanism 24 constructed and arranged to lock the tilt deck 12 in place. In various implementations, the locking mechanism 24 locks the tilt deck 12 in a level position for transport. The locking mechanism 24 may additionally be used to unlock the tilt deck 12 and allow the free motion of the tilt deck 12. That is, in various implementations, when the trailer 10 is stopped, a user is able to unlock the tilt deck 12 via the locking mechanism 24 so as to allow the tilt deck 12 to pivot about a fulcrum or pivot point such that the ramp 18 is in contact with the ground to facilitate loading and unloading.

Figure 7:
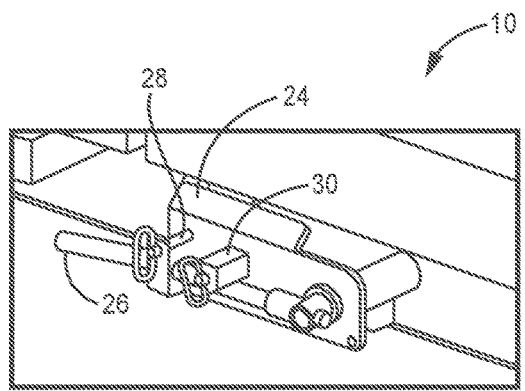
FIG. 7 is a close-up view of the locking mechanism and handle, according to certain implementations.

According to some implementations, the locking mechanism 24 can be disengaged or opened to allow for raising and/or lowering of the tilt deck 12. That is, when the tilt deck 12 is in the unlocked position, the tilt deck 12 lowers to ground. In the implementation of FIG. 7, the locking mechanism 24 comprises a handle 26, a safety detent pin 28, and a spring latch 30 in operational communication so as to facilitate the locking and unlocking of the tilt deck 12, as would be appreciated. It is further appreciated that alternate implementations can employ alternate locking mechanisms known and understood in the art to facilitate the locking/unlocking states described herein.

Figure 8A:
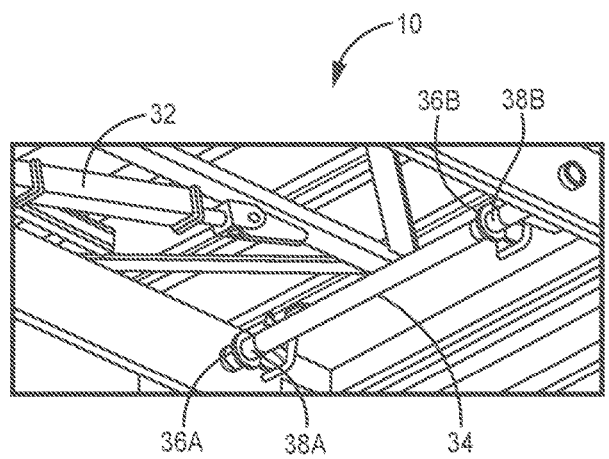
FIG. 8A is a close-up underside view of the split-tilt deck trailer showing the cylinder and locking axle, according to certain implementations.
Figure 8B:
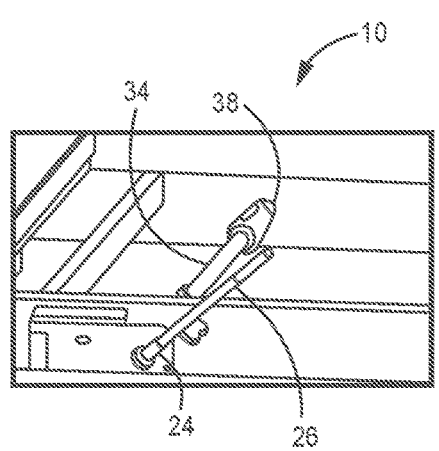
FIG. 8B is a partial side view of the split-tilt deck trailer locking axle and latching mechanism handle, according to certain implementations.
Figure 8C:
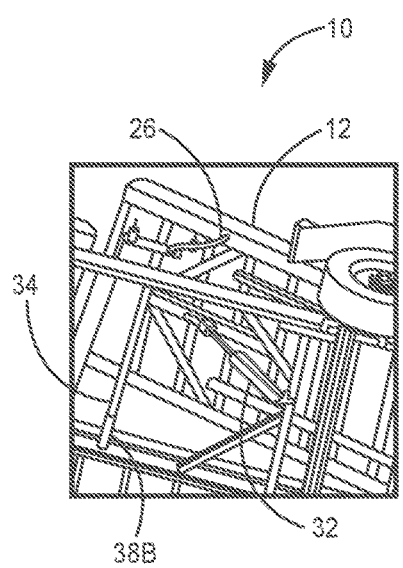
FIG. 8C is a further underside view of the locking components and cylinder in the loading position, according to certain implementations.

As shown in FIGS. 8A-8C, various implementations of the trailer 10 have a cylinder 32 such as a cushioned cylinder 32 disposed on the underside of the trailer 10 and in operational communication with the tilt deck 12. In alternate implementations, the cylinder 32 may be in operational communication with hydraulics so as to raise and lower the tilt deck 14 hydraulically.

It is understood that when the tilt deck 12 is lowered the operator is able to load equipment, which can urge the tilt deck 12 back into the aligned or transport position. Once the equipment is loaded, then the locking mechanism 24 is returned to the locked position and the trailer 10 is ready for transport.

Turning back to the locking mechanism 24, in some implementations, the locking mechanism 24 is in latching communication with the tilt deck 12 via latch hooks 36A, 36B disposed on the underside of the tilt deck 12 and locking lugs 38A, 38B disposed on ends of a locking axle 34. In various implementations, the locking axle 34 is in rotational communication with the locking mechanism handle 26, as would be understood. In these implementations, rotation of the locking axle 34 via the handle 26 pivots the lugs 38A, 38B so as to clasp the latch hooks 36A, 36B and secure the tilt deck 12 in the locked position.

Figure 9A:
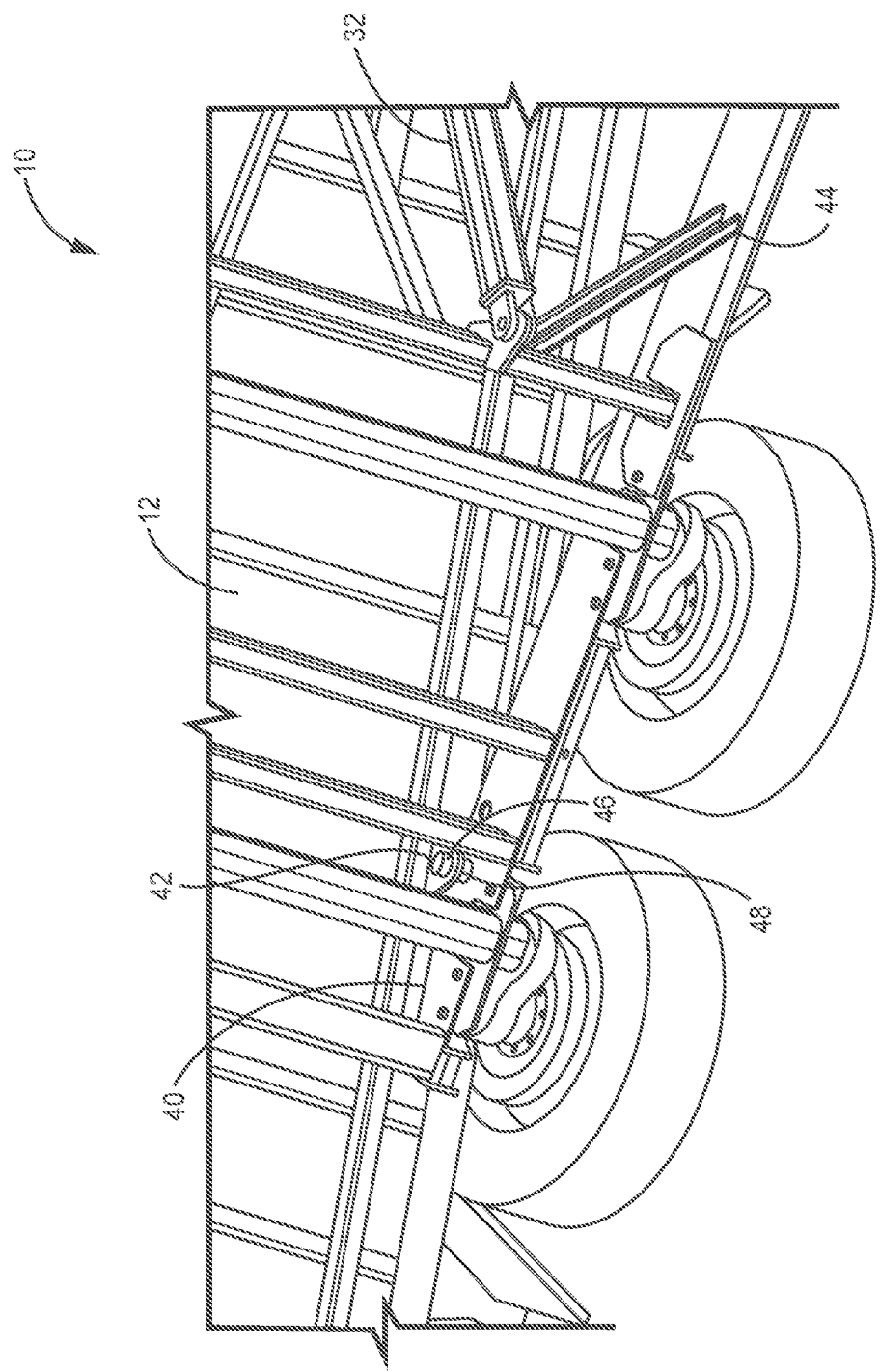
FIG. 9A is an underside view of the tilt deck, according to one implementation.
Figure 10:
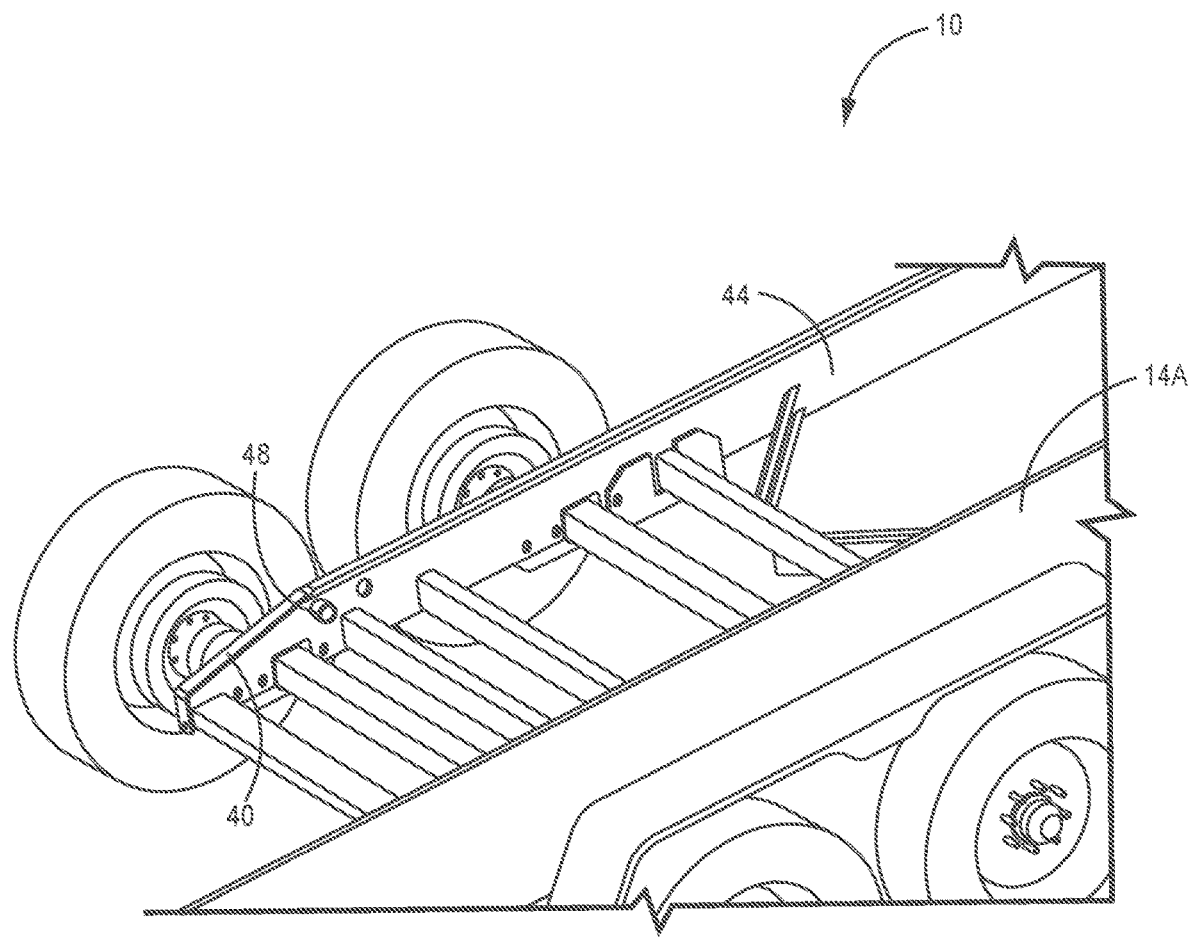
FIG. 10 is a top view of the trailer without the tilt deck, according to one implementation.

FIGS. 9A, 9B, and 10 depict a tilting mechanism for a split deck tilt trailer 10, according to some implementations. FIG. 9A depicts an underside view of the tilting mechanism. FIG. 9B depicts an underside view of the titling mechanism without the main frame 44. FIG. 10 depicts a top view of a split deck tilt trailer 10 without the tilt deck 12. In various implementations, the tilt deck 12 pivots on an axel defined by a bushing 48, lug 42, and pin 46.

In some implementations, the bushing 48 is disposed on the bottom frame 44. The bushing 44 may be welded through the bottom frame 44. In various implementations, the tilt deck 12, has lugs 42. The lugs 42 may wrap the bottom frame 44 to be operatively engaged with the bushing 48. A pin 46 may be placed though the bushing 48 and lugs 42 to secure the tilt deck 12 to the bottom frame 44. As the tilt deck 12 tilts (as described above) the bottom surface of the tilt deck 12 comes in contact with the tilt deck contact surface 40 on the bottom frame 44. The tilt deck contact surface 40 supports the tilt deck 12 while the tilt deck 12 is in the tilted position.

Figure 11:
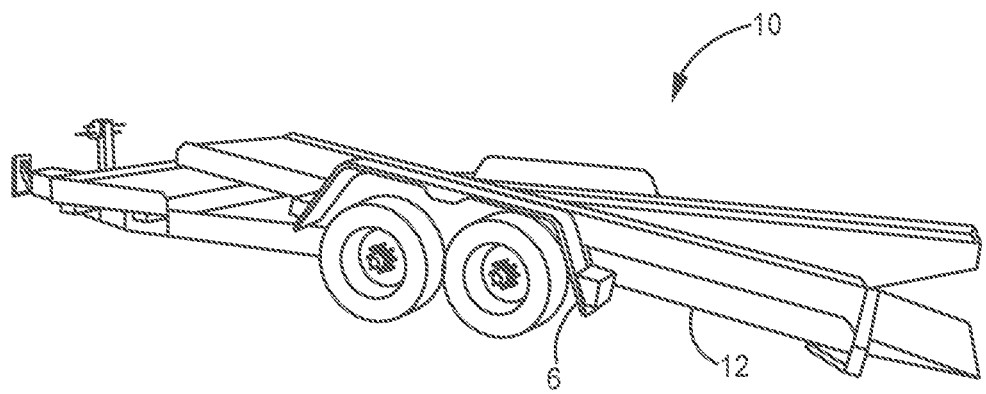
FIG. 11 depicts a split-tilt deck trailer in the tilted, unlocked position, according to one implementation.
Figure 12:
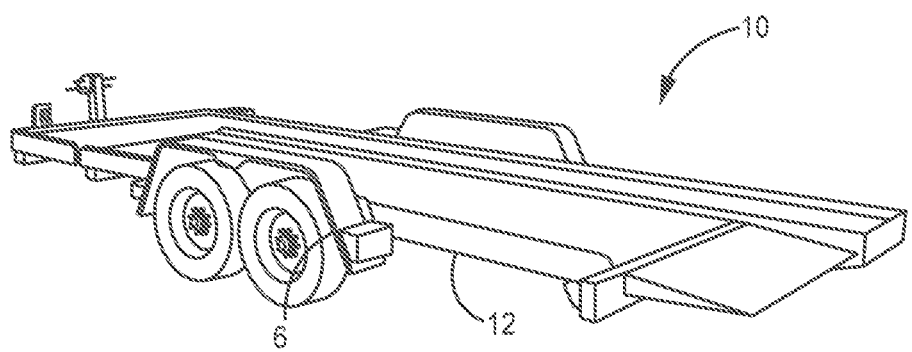
FIG. 12 depicts a split-tilt deck trailer in the locked, transport position, according to one implementation.

FIG. 11 depicts a split deck tilt trailer 10 in the tilted, unlocked position, while FIG. 12 depicts a split deck tilt trailer 10 in the locked, transport position. In some implementations, the fender 6 may be operatively engaged with the tilt deck 12, such that as the tilt deck 12 tilts so does the fender 6.

Figure 13:
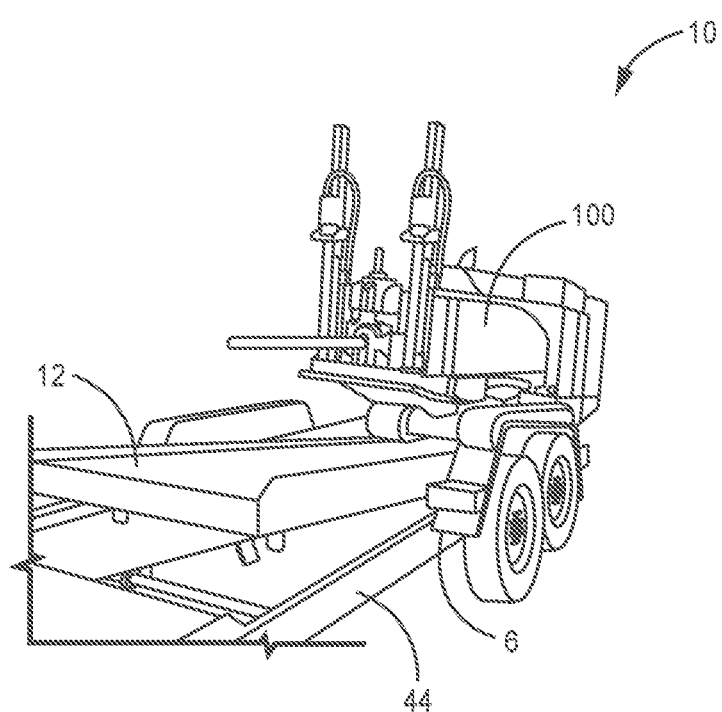
FIG. 13 depicts a split-tilt deck trailer being loaded with a directional drill, according to one implementation.
Figure 14:
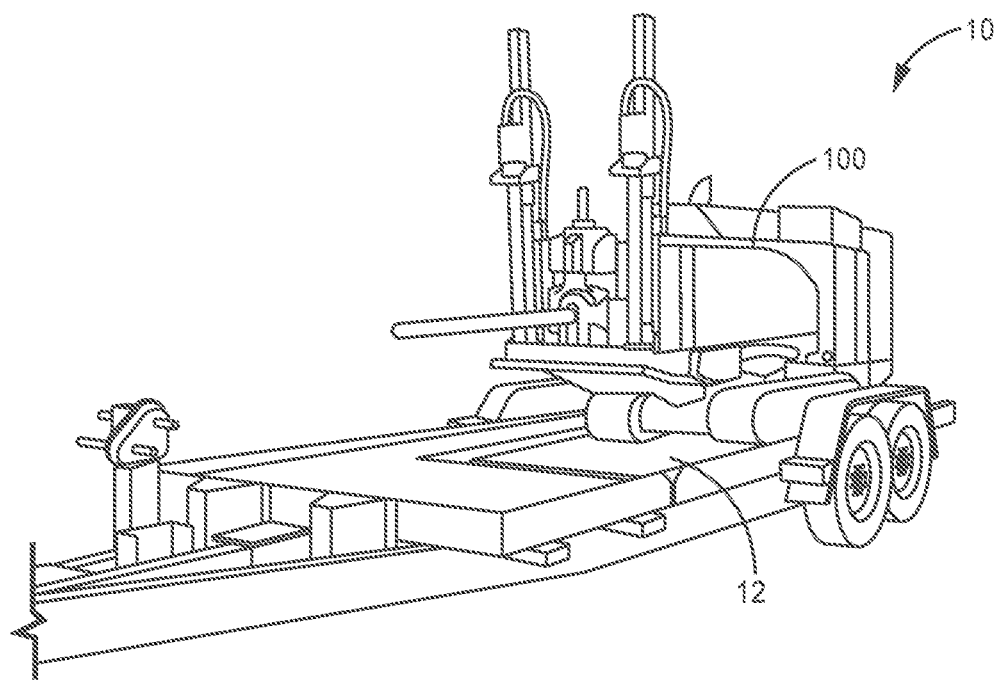
FIG. 14 depicts a split-tilt deck trailer with a loaded directional drill, according to one implementation.

FIG. 13 depicts a split deck tilt trailer 10 in use in the tilted or loading position and being loaded with a directional drill 100, while FIG. 14 depicts a split deck tilt trailer 10 after a directional drill 100 has been loaded on the tilt deck 12 and the tilt deck returned to a locked position.

Although the disclosure has been described with references to various embodiments, persons skilled in the art will recognized that changes may be made in form and detail without departing from the spirit and scope of this disclosure.

What is claimed is:

1. A split-tilt deck trailer, comprising:
   (a) a frame;
   (b) an elongate stationary deck rigidly coupled to the frame;
   (c) an elongate tilt deck pivotably coupled to the frame; and
   (d) a locking mechanism comprising a handle rotatably mounted to the frame, at least one locking lug, and at least one hook,
   wherein rotation of the handle in a first direction locks the elongate tilt deck in a transport position and rotation of the handle in a second direction unlocks the elongate tilt deck for pivoting into a loading position for implement loading,
   wherein one of the at least one hook and at least one locking lug is attached to the elongate tilt deck and the other of the at least one hook and at least one locking lug is coupled to the handle, and
   wherein the elongated tilt deck is constructed and arranged to be lowered by gravity when not carrying a load.

2. The split-tilt deck trailer of claim 1, wherein the locking mechanism further comprises an axle coupled to the handle, wherein rotation of the handle in the first direction rotates the axle to engage the at least one hook and the at least one locking lug to lock the elongate tilt deck and wherein rotation of the handle in the second direction rotates the axle to disengage the at least one hook and the at least one locking lug to unlock the elongate tilt deck.

3. The split-tilt deck trailer of claim 1, wherein the locking mechanism further comprises a safety pin removably mounted across the path of rotation of the handle to restrict rotation of the handle in the second direction and prevent unlocking of the elongate tilt deck.

4. The split-tilt deck trailer of claim 1, further comprising a stationary front deck coupled to the frame.

5. The split-tilt deck trailer of claim 1, wherein the transport position is a substantially horizontal position.

6. A trailer comprising:
   (a) a frame;
   (b) an elongate first deck pivotably coupled to the frame;
   (c) an elongate second deck rigidly coupled to the frame, the elongate second deck adjacent to and extending lengthwise alongside a length of the elongate first deck,
   wherein the elongate first deck is pivotable relative to the frame and the elongate second deck for pivoting between a transport position and a loading position;
   wherein the elongate second deck is not pivotable relative to the frame and the elongate first deck,
   wherein the elongate first deck is constructed and arranged to be lowered by gravity when not carrying a load,
   wherein the elongate first deck is constructed and arranged to be locked in place with one or more locking lugs and at least one hook, and
   wherein one of the at least one hook and at least one locking lug is attached to the elongate first deck and the other of the at least one hook and at least one locking lug is coupled to the frame.

7. The trailer of claim 6, wherein the elongate first deck is substantially parallel to the elongate second deck in the transport position.

8. The trailer of claim 6, further comprising a locking axle, wherein rotation of the locking axle in a first direction engages the at least one hook and the at least one locking lug to lock the elongate first deck in the transport position and wherein rotation of the locking axle in a second direction disengages the at least one hook and at least one locking lug to unlock the elongate first deck for pivoting into the loading position.

9. The trailer of claim 8, further comprising a handle coupled to the locking axle.

10. The trailer of claim 9, further comprising a safety pin removably mounted adjacent to the handle to restrict rotation of the handle and the locking axle to prevent unlocking of the elongate first deck.

11. The trailer of claim 6, further comprising a third deck coupled to the frame at a first end of the elongate first deck and the elongate second deck.

12. The trailer of claim 6, further comprising a ramp coupled to a distal end of the elongate first deck.

13. A split-deck trailer comprising:
   (a) a frame;
   (b) a tilt deck pivotably coupled to the frame, the tilt deck movable between a substantially horizontal transport position and a tilted loading position;
   (c) a stationary deck rigidly coupled to the frame, the stationary deck extending alongside a length of the tilt deck;
   (d) a cushioned cylinder operatively coupled between the frame and the tilt deck; and
   (e) a locking mechanism comprising a handle rotatably mounted to the frame, one or more locking lugs, and one or more hooks, the frame, one or more locking lugs, and one or more hooks configured to lock the tilt deck in position, wherein rotation of the handle locks and unlocks movement of the tilt deck in the transport position, wherein the tilt deck is constructed and arranged to be lowered by gravity when not carrying a load.

14. The split-deck trailer of claim 13, wherein in the transport position the tilt deck is substantially adjacent to and parallel with the stationary deck.

15. The split-deck trailer of claim 13, wherein the locking mechanism further comprises a locking axle coupled to the handle, wherein rotation of the handle rotates the locking axle to engage the at least one hook and the at least one locking lug to lock the tilt deck and disengage the at least one hook and the at least one locking lug to unlock the tilt deck.

16. The split-deck trailer of claim 13, wherein the locking mechanism further comprises a safety pin removably mounted separately from the handle and adjacent to the handle to restrict rotation of the handle to prevent unlocking of the tilt deck.

17. The split-deck trailer of claim 13, wherein the locking mechanism further comprises a locking axle coupled with the handle and supported by the frame underneath the tilt deck, first and second locking lugs mounted to the locking axle, and first and second hooks mounted to an underside of the tilt deck, wherein rotation of the handle and the locking axle engages the first and second locking lugs with the first and second hooks to lock the tilt deck and disengages the first and second lugs from the first and second hooks to unlock the tilt deck.

18. The split-deck trailer of claim 13, wherein the cushioned cylinder is operatively coupled with a hydraulic system.

* * * * *